United States Patent [19]

Sutaruk

[11] 4,235,322
[45] Nov. 25, 1980

[54] FLUID COUPLING DEVICE HAVING MORE RESPONSIVE ENGAGEMENT AND DISENGAGEMENT

[75] Inventor: Alex Sutaruk, Carpinteria, Calif.

[73] Assignee: Eaton Corporation, Cleveland, Ohio

[21] Appl. No.: 898,592

[22] Filed: Apr. 21, 1978

[51] Int. Cl.$^2$ ............................................ F16D 35/00
[52] U.S. Cl. .................................. 192/58 B; 192/82 T
[58] Field of Search ........................... 192/58 B, 82 T

[56] References Cited

U.S. PATENT DOCUMENTS

| | | | |
|---|---|---|---|
| 3,055,473 | 9/1962 | Oldberg et al. | 192/58 B |
| 3,559,786 | 2/1971 | Long | 192/82 T X |
| 3,648,811 | 3/1972 | LaFlame | 192/58 B |
| 3,688,884 | 9/1972 | Perrin et al. | 192/58 B |
| 3,713,520 | 1/1973 | Kerr | 192/82 T X |
| 3,809,197 | 5/1974 | Clancey | 192/58 B |
| 4,060,158 | 11/1977 | Kikuchi | 192/82 T |

Primary Examiner—Rodney H. Bonck
Attorney, Agent, or Firm—R. J. McCloskey; J. Yakimow; L. Kasper

[57] ABSTRACT

A fluid coupling device is disclosed of the type including an output coupling member, a cover, a valve plate separating the fluid reservoir chamber from the fluid operating chamber, and an input coupling member rotatably disposed in the operating chamber. Valving controls the flow of fluid between the reservoir and the operating chamber in response to variations in a condition such as temperature. The input member has a front face adjacent the valve plate and a rear face cooperating with the adjacent surface of the output member to define interdigitated lands and grooves. The input member defines a plurality of fluid passages permitting direct axial communication of fluid between the front face and the lands and grooves. This direct flow into and out of the lands and grooves is effective to reduce substantially the time required to achieve full engagement and full disengagement of the coupling. The invention is also effective to feed fluid into the lands and grooves during engagement, to increase the overall torque capacity of the coupling.

8 Claims, 5 Drawing Figures

FLUID COUPLING DEVICE HAVING MORE RESPONSIVE ENGAGEMENT AND DISENGAGEMENT

BACKGROUND OF THE DISCLOSURE

The present invention relates to fluid coupling devices, and more particularly, to such devices which are capable of changing between the engaged and disengaged conditions, in response to variations in a predetermined condition such as engine compartment temperature.

A fluid coupling device of the type to which the present invention relates typically includes an input coupling member and an output coupling member. The output coupling member cooperates with a cover to define a fluid chamber, and a valve plate separates the chamber into a reservoir and an operating chamber. The input coupling member is rotatably disposed in the operating chamber, with its front face adjacent the valve plate. The rear face of the input coupling member, and the adjacent surface of the output member form a series of interdigitated lands and grooves, defining a shear space therebetween.

The valve plate includes a valving arrangement operable in response to variations in a condition such as temperature to permit fluid to flow from the reservoir, through the valve plate inlet port into the operating chamber. Typically, such fluid couplings include a discharge port defined by the valve plate and disposed near the outer periphery of the operating chamber, with some form of pumping element disposed adjacent thereto, and within the operating chamber, such that a small quantity of fluid is continually pumped from the operating chamber back into the reservoir even while the coupling is engaged. The overall torque transmitting capability of the coupling is related to the quantity of fluid in the shear space, and therefore, it is important to achieve a proper balance between the rate of fluid discharge from the operating chamber, and the rate of inlet flow into the shear space, when the coupling is in the engaged condition.

In conventional fluid coupling devices, it is believed that fluid flows one of two probable flow paths from the inlet port to the shear space, or a combination thereof. One possibility is for the fluid to flow radially outward along the front face of the input member, then along the OD of the input, and finally, radially inward to the shear space. Another possibility is that the fluid flows radially outward along the front face of the input member until an annulus of fluid builds up which extends far enough radially inwardly to communicate with one or more circulation holes defined by the input member, such that fluid flows axially through such holes, then radially outwardly into the shear space through a plurality of radial channels passing through the lands and grooves of the input and output members. In view of the affect of the abovementioned radial channels on fill time, the latter mentioned flow path would seem to be more likely.

Among the problems associated with devices of the type described above is an insufficient peak speed of the output member. This condition can occur if the rate of inlet flow, relative to the rate of discharge flow is insufficient to maintain sufficient fluid in the shear space or if, as has been hypothesized, too much of the fluid in the operating chamber remains between the front face of the input and the valve plate. Also, if a fluid of higher viscosity is used in an attempt to increase the torque capacity of the coupling, sufficient filling of the shear space becomes even more difficult.

Another problem area, also related to the filling of the shear space, is the characteristic known as "response time". As used herein, the term "response time" refers to the ability of the coupling device to go from the disengaged condition to the fully engaged condition in a rapid and predictable manner in response to the opening of the valving. By way of example, when the coupling device is being used to drive the radiator cooling fan of a vehicle engine, it is important for the fluid to fill the shear space quickly and sufficiently in response to the valving starting to open when the temperature approaches the maximum allowable, in order to bring the coupling to peak speed and prevent overheating of the engine. It is also desirable, when the valve closes, for the fluid to be pumped out of the shear space and back into the reservoir quickly, returning the coupling to the disengaged condition, to prevent unnecessary and wasteful power consumption by the coupling.

SUMMARY OF THE INVENTION

Accordingly, it is an object of the present invention to provide a fluid coupling device of the type described in which filling of the shear space is more closely responsive to operation of the valving.

It is a related object of the present invention to provide a fluid coupling device which achieves the above-stated object and, in addition, is capable of pumping fluid out of the shear space and back to the reservoir more quickly, in response to closing of the valving.

The above and other objects of the present invention are accomplished by the provision of an improved fluid coupling device of the type described herein. The input coupling member has one face disposed adjacent the valve means and an opposite face, the opposite face and the adjacent surface of the output coupling member being closely spaced apart to define a shear space therebetween and operable to transmit torque in response to the presence of fluid therein. The input coupling member defines fluid passage means operable to communicate fluid from adjacent the one face directly into the shear space, over at least a major portion of the radial extent of the shear space.

In accordance with another aspect of the present invention, the opposite face of the input coupling member and the adjacent surface of the output coupling member define a plurality of interdigitated lands and grooves, defining the shear space therebetween.

In accordance with yet another aspect of the present invention, the valve means includes a fluid inlet port operable to communicate fluid from the reservoir to the operating chamber, and a fluid discharge port, operable to communicate fluid from the operating chamber back into the reservoir chamber. The fluid inlet port is disposed adjacent the radially innermost extent of the fluid passage means defined by the input coupling member, and the fluid discharge port is disposed adjacent the radially outermost extent of the fluid passage means.

BRIEF DESCRIPTION OF THE DRAWINGS

FIG. 2 is a left elevation view of the input coupling member, on a smaller scale than FIG. 1, and indicating by means of line 1—1 the plane on which FIG. 1 is taken.

DESCRIPTION OF THE PREFERRED EMBODIMENT

Figure 1:
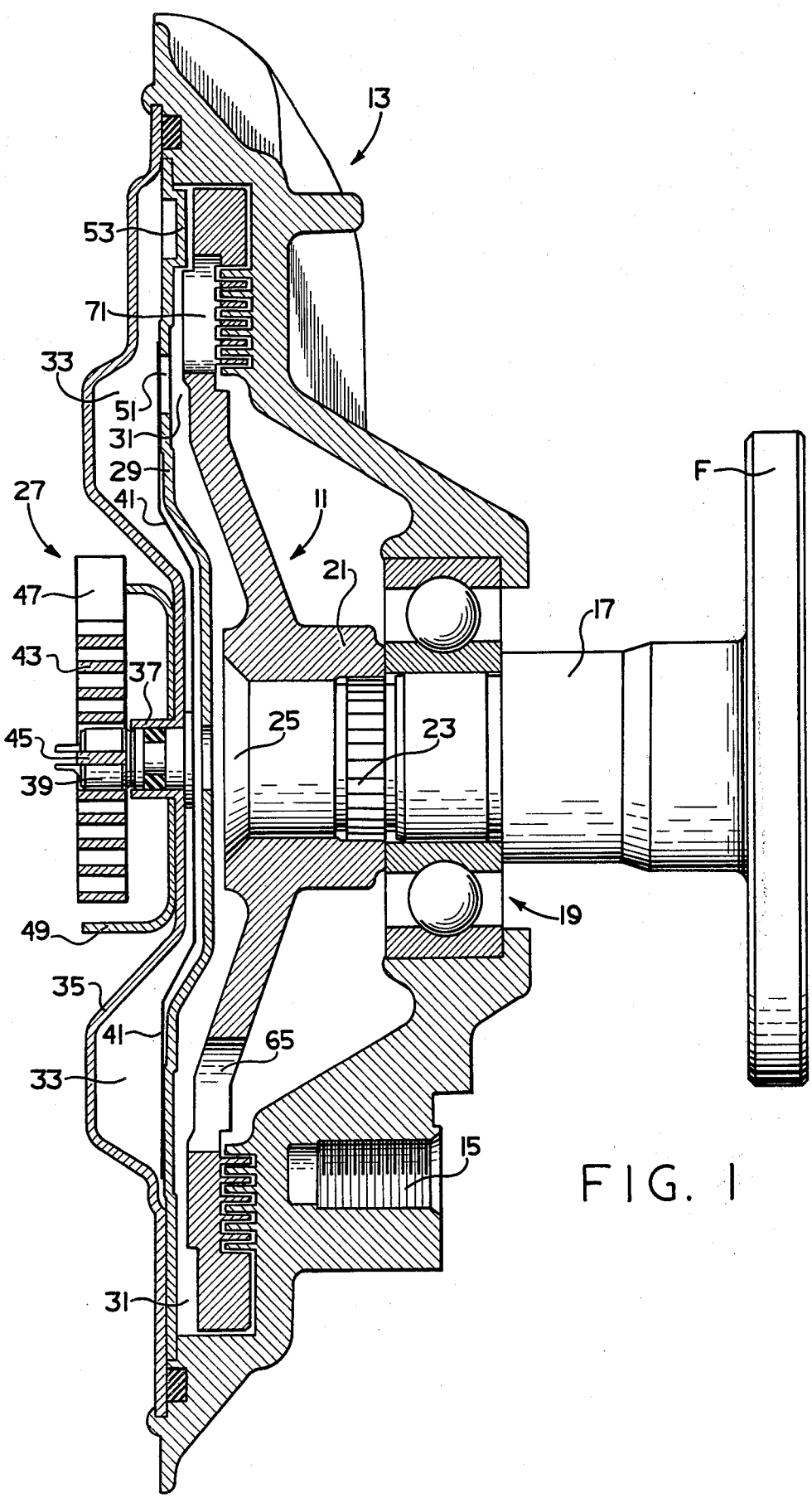
FIG. 1 is an axial cross section of a typical fluid coupling device utilizing the present invention.

Referring now to the drawings, which are not intended to limit the invention, FIG. 1 illustrates one preferred form of a fluid coupling device in which the present invention may be utilized. The fluid coupling device includes an input coupling member 11 and an output coupling member 13. The fluid coupling device of the present invention may be used as a drive for an automotive engine accessory, such as a radiator cooling fan. The fan (not shown) may be bolted to the output coupling member 13 by means of a plurality of threaded bores 15 formed in the member 13. It will be understood, however, that the use of the present invention is not limited to any particular fluid coupling application or configuration, except as specifically noted hereinafter.

The fluid coupling includes an input shaft 17 on which the input member 11 is mounted and which is rotatably driven, typically by means of a flange F which may be bolted to the flange of an engine water pump (not shown). The input shaft 17 functions as a support for the inner race of a bearing set 19, which is seated on the inside diameter of the output coupling member 13.

The input coupling member 11 is in the form of an annular disc having a hub portion 21 supported by the forward end of the shaft 17. The hub portion 21 has an opening therethrough which has an interference fit with a serrated portion 23 of the shaft 17. The hub portion 21 is pressed onto the serrated portion 23 until it abuts the side of the inner race of the bearing set 19, and the output end (left end in FIG. 1) of the shaft 17 has a retaining portion 25 for positive retention of the input coupling member 11 on the shaft 17, such that rotation of the shaft 17 causes rotation of the input coupling member 11.

The output coupling member 13 cooperates with a cover assembly, generally designated 27, to define a fluid chamber therebetween, the fluid chamber being separated by a valve plate 29 into a fluid operating chamber 31 and a fluid reservoir chamber 33. The operating chamber 31 comprises the entire volume between the valve plate 29 and the output member 13.

Included as part of the cover assembly 27 is a stamped cover member 35 defining a central cylindrical portion 37. Rotatably disposed within the cylindrical portion 37, and supported thereby, is a valve shaft 39, extending outwardly (to the left in FIG. 1) through the cover member 35. Attached to the inner end of the valve shaft 39 is a valve arm 41, the general construction and operation of which may be better understood by reference to U.S. Pat. No. 3,055,473, which is incorporated herein by reference.

Attached to the outer end of the valve shaft 39 is a bimetallic coil 43, including an inner end 45 received within a slot formed by the outer end of the valve shaft 39, and an outer end 47 received by a bracket member 49. The bracket member 49 is attached to the cover member 35, as by welding, such that the outer end 47 of the bimetal coil 43 is fixed relative to the cover member 35. The manner in which the bimetal coil 43 operates to control the movement of the valve arm 41 is well known in the art, is not an essential feature of the present invention and therefore, will not be described further.

Figure 4:
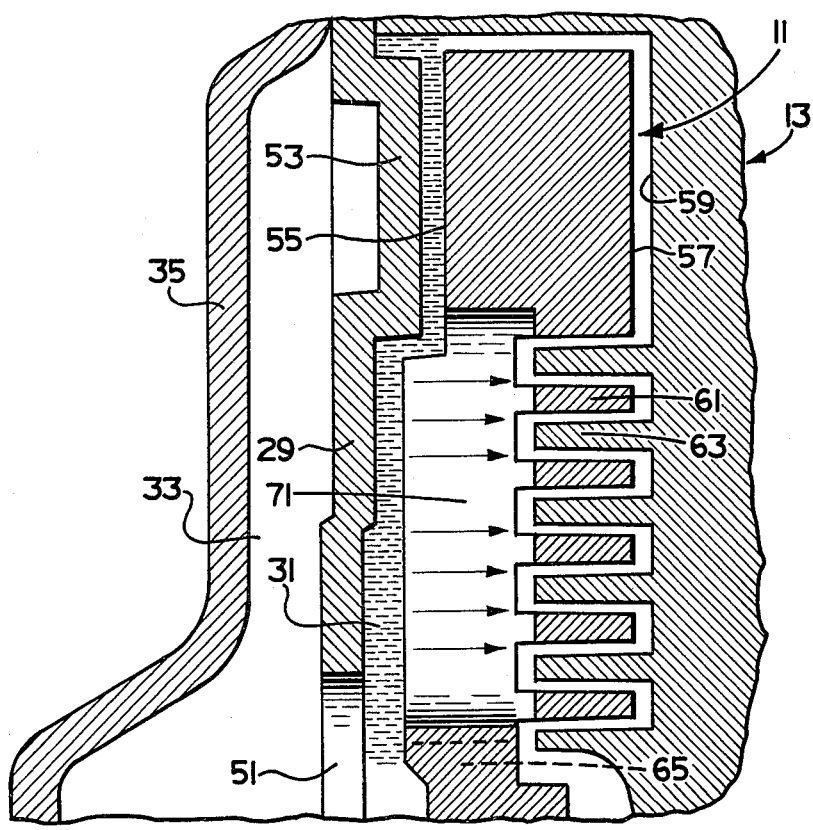
FIG. 4 is an enlarged, fragmentary cross section, similar to FIG. 1, illustrating the invention in greater detail.

Referring now to FIG. 4, in conjunction with FIG. 1, the valve plate 29 defines a fluid inlet port 51. With the valve arm 41 in the position shown in FIG. 1, fluid flow from the reservoir 33 through the inlet port 51, and into the operating chamber 31 is blocked. However, when the valve arm 41 moves to a position uncovering the inlet port 51 (as illustrated in FIG. 4), fluid is permitted to flow through the inlet port 51 into the operating chamber 31.

Disposed adjacent the outer periphery of the operating chamber 31 and of the input coupling member 11 is a pumping element 53, operable to engage the relatively rotating fluid to generate a region of higher pressure, and continually pump a small quantity of fluid from the operating chamber 31 back into the reservoir 33 through an adjacent discharge orifice not shown herein, but illustrated and described in above incorporated U.S. Pat. No. 3,055,473.

For purposes of subsequent discussion, but with no intent to limit the present invention, it will be assumed that the vehicle embodying the fluid coupling device of the invention is moving to the left in FIG. 1, such that the front of the device is disposed toward the left and the rear of the device is disposed toward the right. Accordingly, the input coupling member 11 includes a front face 55 disposed adjacent the valve plate 29, and a rear face 57 (see FIG. 4). The rear face 57 and the adjacent surface 59 of the output coupling member 13 cooperate to define a shear space therebetween. As is well known in the art, the torque transmitting capability of such a fluid coupling is related to many factors, including the total shear area and the extent to which the shear space is filled with viscous fluid.

Figure 5:
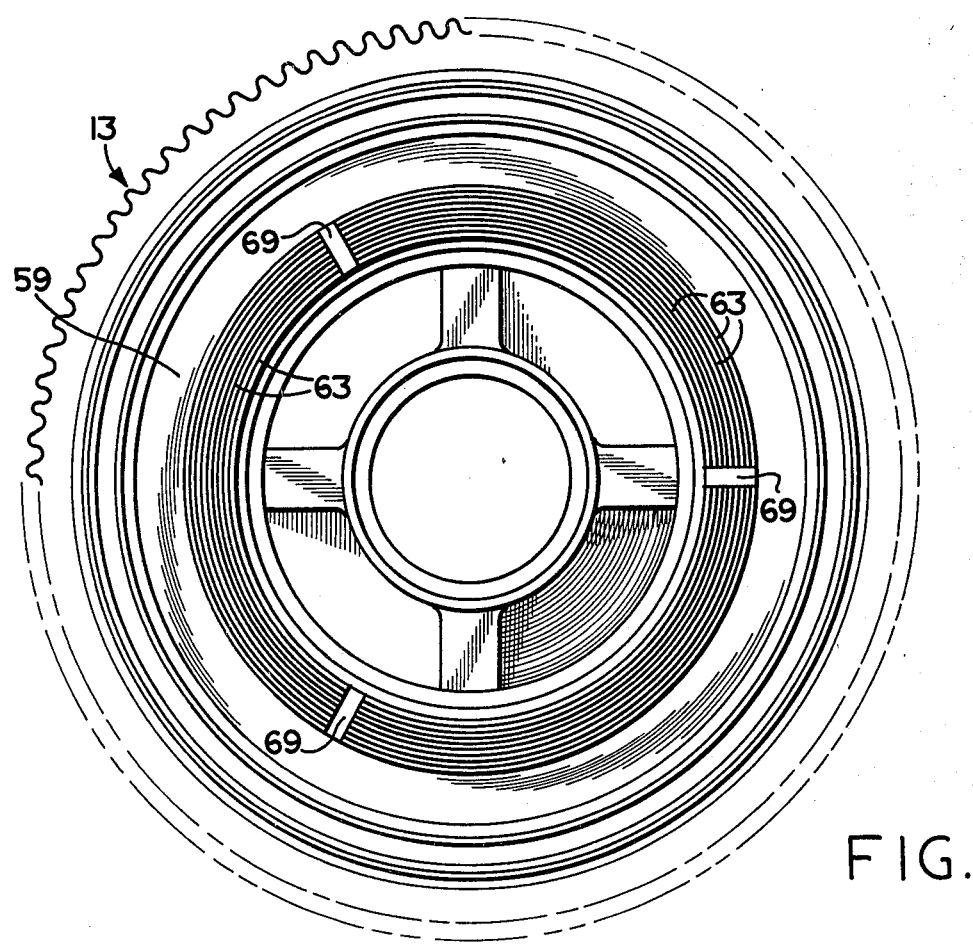
FIG. 5 is a left side elevation of the output coupling member, on the same scale as FIG. 2.

In the subject embodiment, the rear face 57 of the input member 11 forms a plurality of annular lands 61 (FIGS. 3 and 4), defining a plurality of annular grooves therebetween. Similarly, the surface 59 of the output coupling member 13 forms a plurality of annular lands 63 (FIGS. 4 and 5) defining annular grooves therebetween. The lands and grooves are interdigitated to define a serpentine-shaped shear space therebetween, thus providing a substantially greater total shear area for a given diameter of the coupling members than would be provided by adjacent flat surfaces. Although the present invention may be utilized in a fluid coupling device having various shear space configurations, it is especially advantageous with such a device in which the shear space is defined by interdigitated lands and grooves, and will be described in connection therewith.

Figure 2:
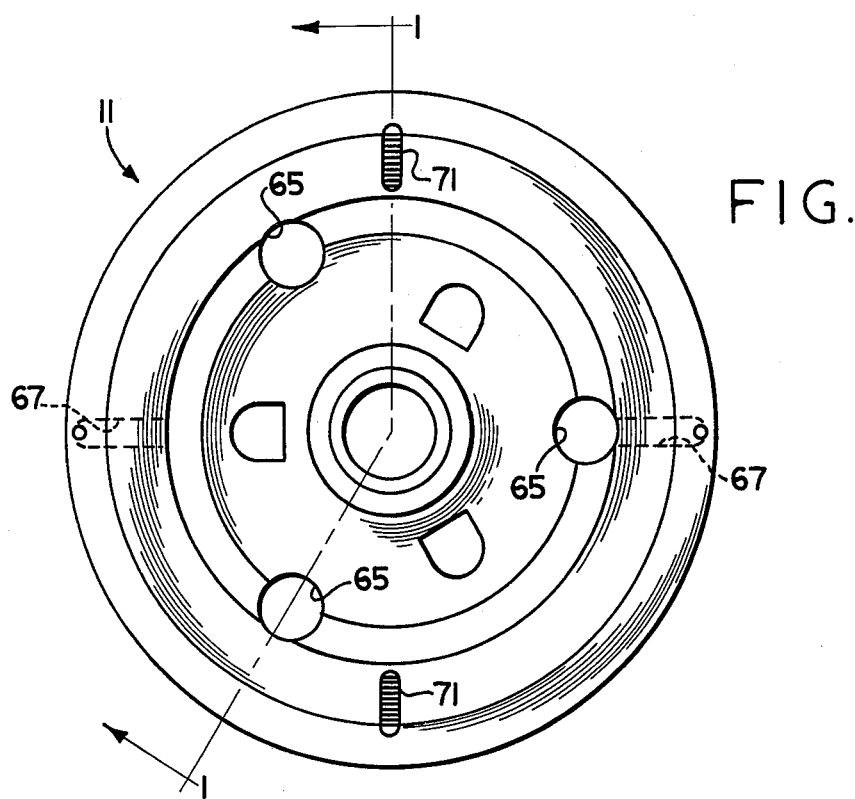
Figure 3:
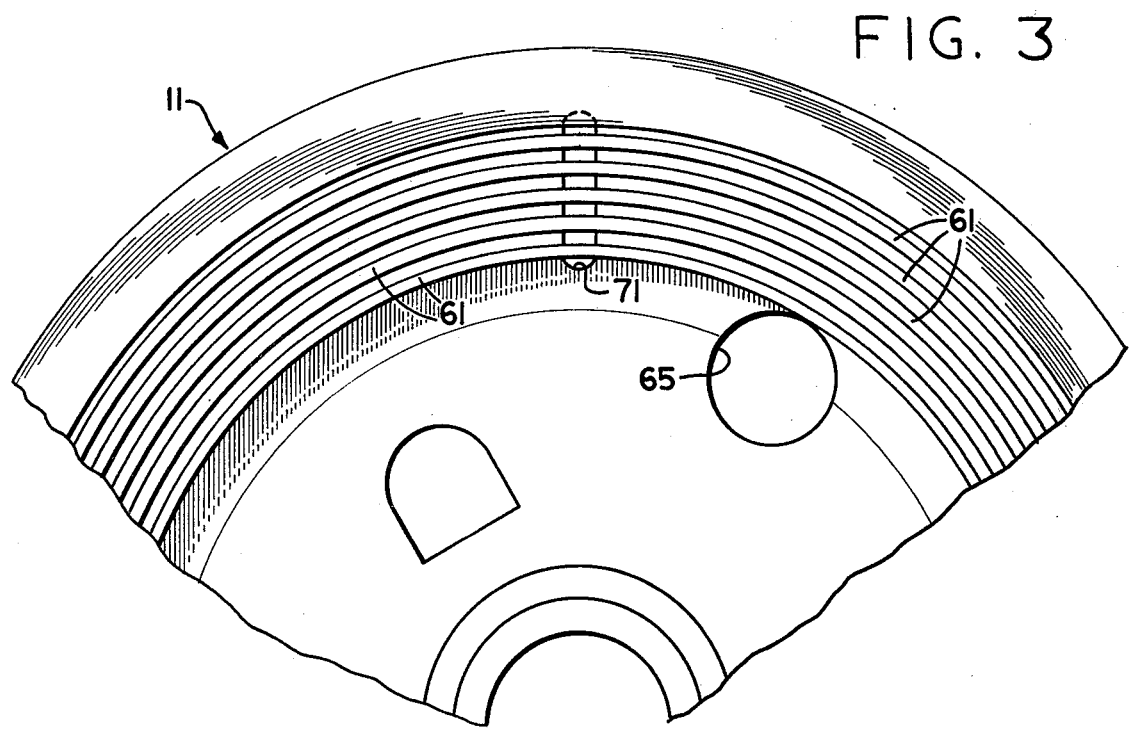
FIG. 3 is a fragmentary right side elevation of the input coupling member, on the same scale as FIG. 1.

As may be seen in FIGS. 1, 2, and 3, the input coupling member 11 defines a plurality of circulation holes 65 which have conventionally been included in the design of the subject embodiment. As was referred to in the background of the specification, it is believed that in order to fill the shear space prior to the present invention, fluid entering the operating chamber 31 through the inlet port 51 would first have to flow radially outwardly, filling the annular volume defined by the front face 55 and the valve plate 29 until this annular volume of fluid extended radially inwardly a sufficient distance to communicate with the circulation holes 65. Fluid would flow rearwardly through the holes 65 into the space between the input member 11 and the output member 13, then radially outwardly into the shear space. In order to get fluid into the outer lands and grooves as quickly as possible, the prior art has utilized a plurality of radial channels 67 on the rear face of the input member 11 (FIG. 2) and a plurality of radial channels 69 defined by the output member 13 (FIG. 5), the number of channels 67 and of channels 69 preferably being different to provide a phased communication therebetween during relative rotation of the members 11 and 13.

Referring now primarily to FIG. 4, but also to FIGS. 2 and 3, the present invention provides fluid passage means operable to communicate fluid from adjacent the front surface 55 directly into the shear space when fluid is entering the operating chamber 31 through the inlet port 51. Conversely, the fluid passage means is operable to communicate fluid directly out of the shear space and radially outward toward the pumping element 53 when fluid flow through the inlet port 51 is blocked. In the subject embodiment, the fluid passage means comprises a pair of diametrically opposed fluid passages 71 (FIG. 2). Preferably, each of the passages 71 has substantially the same radial extent as the radial extent of the primary shear space which, in the subject embodiment, is the shear space defined by the interdigitated lands and grooves. Accordingly, as may be seen by the arrows in FIG. 4, substantially the entire shear space can be filled in a relatively short period of time, merely by direct axial flow of fluid from the chamber adjacent the front face 55, without the necessity of fluid flowing radially through the serpentine shear space.

The ability to communicate fluid to and from the shear space quickly is further facilitated by one aspect of the present invention, seen best in FIG. 4, wherein the inlet port 51 is disposed adjacent the radially innermost extent of the passages 71, and the pumping element 53 and the discharge port are disposed adjacent the radially outermost extent of the passages 71. In either case, therefore, the desired flow path is assisted by the effects of centrifugal force.

It is an important feature of the present invention that the passages 71 communicate fluid to and from the shear space, but do not result in an interruption of the lands 61, because such an interruption would reduce the total effective shear area and torque transmitting ability. Therefore, even though the subject embodiment includes only two of the passages 71, it should be apparent that a different number of the passages 71 could be employed and that they could have various configurations other than the oblong shape shown.

In order that the passages 71 do not interrupt or otherwise interfere with the lands 61, it is preferred that they be formed from the front face 55, typically by either casting or milling an appropriate number of blind recesses in the shape of the passages 71. As may best be seen in FIG. 4, these blind recesses should be made deep enough such that subsequent machining of the lands and grooves results in open communication between the passages 71 and the grooves between the lands 61.

What is claimed is:

1. A fluid coupling device comprising a first rotatable coupling member defining an axis of rotation, cover means associated with said first member to define a fluid chamber therebetween, valve means disposed to separate said fluid chamber into a fluid operating chamber and a fluid reservoir chamber, a second rotatable coupling member disposed in said fluid operating chamber and being rotatable relative to said first coupling member, said valve means being operable to control the flow of fluid between said reservoir chamber and said operating chamber, and including means associated with said valve means to effect the operation of said valve means in response to variations in a predetermined condition, said second coupling member being generally disc-like and having one face disposed adjacent said valve means and an opposite face, said opposite face of said second coupling member and the adjacent surface of said first coupling member cooperating to define a plurality of interdigitated lands and grooves defining a shear space therebetween and operable to transmit torque in response to the presence of fluid therein, said second coupling member defining fluid passage means operable to communicate fluid generally axially between said one face and said interdigitated lands and grooves said interdigitated lands and grooves being substantially uninterrupted by said fluid passage means.

2. A fluid coupling device as claimed in claim 1 wherein said valve means includes a valve plate separating said operating chamber and said reservoir chamber and defining a fluid inlet port and a fluid discharge port.

3. A fluid coupling device as claimed in claim 2, wherein said valve means includes a movable valve member operable between a first position permitting fluid flow through said inlet port into said operating chamber and a second position substantially blocking fluid flow through said inlet port.

4. A fluid coupling device as claimed in claim 2 or 3 wherein said fluid discharge port is disposed adjacent the radially outermost extent of said fluid passage means and said fluid inlet port is disposed adjacent the radially innermost extent of said fluid passage means.

5. A fluid coupling device as claimed in claim 1 or 2 wherein said fluid passage means provides fluid communication over substantially the entire radial extent of said interdigitated lands and grooves.

6. A fluid coupling device as claimed in claim 1 wherein said fluid passage means comprises a plurality of substantially identical passages uniformly disposed circumferentially.

7. A fluid coupling device as claimed in claim 1 wherein the radial extent of said fluid passage means coincides approximately with the radial extent of said interdigitated lands and grooves.

8. A fluid coupling device comprising a rotatable output coupling member defining an axis of rotation, a cover member associated with said output member to define a fluid chamber therebetween, a valve plate disposed to separate said fluid chamber into a fluid operating chamber and a fluid reservoir chamber, a rotatable input coupling member disposed in said fluid operating chamber and being rotatable relative to said output member, said valve plate including valve means operable to control the flow of fluid between said reservoir chamber and said operating chamber, said valve means including temperature responsive means operable to control said valve means in response to variations in a predetermined temperature condition, said input coupling member including a generally annular disc portion having a front face disposed adjacent said valve plate, and a rear face, said rear face of said input coupling member and the adjacent surface of said output coupling member cooperating to define a plurality of interdigitated lands and grooves defining a shear space therebetween and operable to transmit torque in response to the presence of fluid therein, said disc portion of said input member defining a plurality of fluid passages operable to communicate fluid generally axially from said front face into said grooves by said rear race of said input coupling member, said lands and grooves defined by said input member being substantially uninterrupted by said fluid passages.

* * * * *